H. MELTZER.
ELASTIC RESILIENT CORE FOR AUTOMOBILE TIRES, &c.
APPLICATION FILED FEB. 14, 1917.

1,247,984.

Patented Nov. 27, 1917.
2 SHEETS—SHEET 1.

Inventor
Harry Meltzer,
By his Attorney
Geo. Wm. Miatt

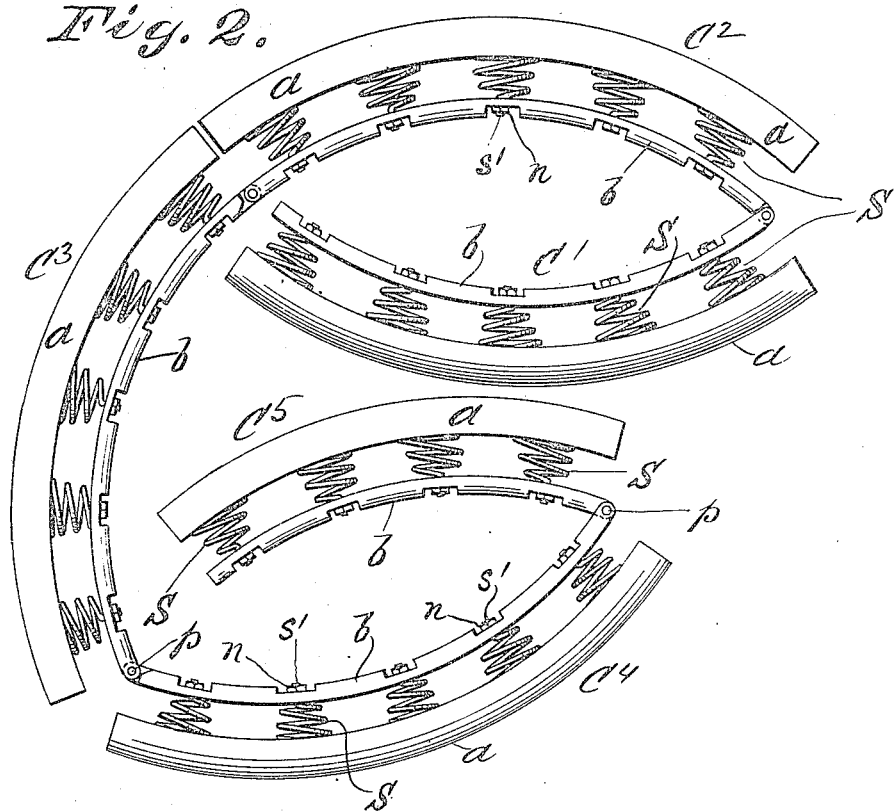
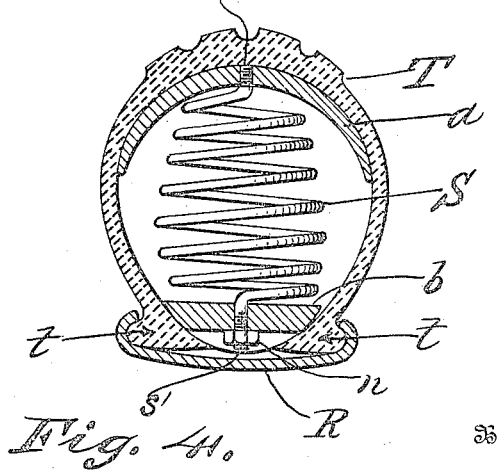
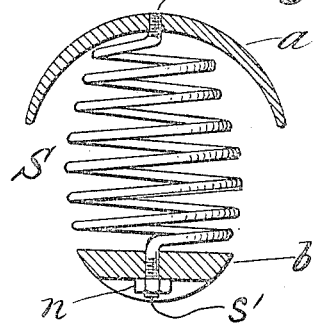

UNITED STATES PATENT OFFICE.

HARRY MELTZER, OF NEW YORK, N. Y.

ELASTIC RESILIENT CORE FOR AUTOMOBILE-TIRES.

1,247,984.   Specification of Letters Patent.   Patented Nov. 27, 1917.

Application filed February 14, 1917. Serial No. 148,477.

*To all whom it may concern:*

Be it known that I, HARRY MELTZER, a citizen of the United States, and a resident of the borough of Bronx, county of Bronx, city and State of New York, have invented certain new and useful Improvements in Elastic Resilient Cores for Automobile-Tires, &c., of which the following is a specification.

My invention relates more especially to automobile tires, although applicable to wheel tires generally. It is designed more particularly for use as a substitute for the pneumatic inner tube used in wheel tires of this class, having all the advantages of elasticity and resilience, but being more substantial and effective because puncture proof and essentially permanent in structure. Furthermore it can be more quickly applied to or removed from a hollow tread tire or casing, is cheaper, and may be folded into compact shape and area for storage or transportation.

The invention consists in the specific construction and arrangements of parts herein described and claimed, distinctive features being the articularly connected segmental subdivisions of the core, and the interposition of coiled springs between the tread-supporting peripheral sections of the core and the rim or base sections of said core, all as hereinafter more fully set forth.

In the accompanying drawings,

Fig. 2, shows the same with the segmental subdivisions partially folded together;

Fig. 3, is a transverse section taken upon plane of line 3—3, Fig. 1, but upon a larger scale;

Fig. 4, is a similar view showing the core inserted in a hollow tread shoe or casing;

Figure 1:
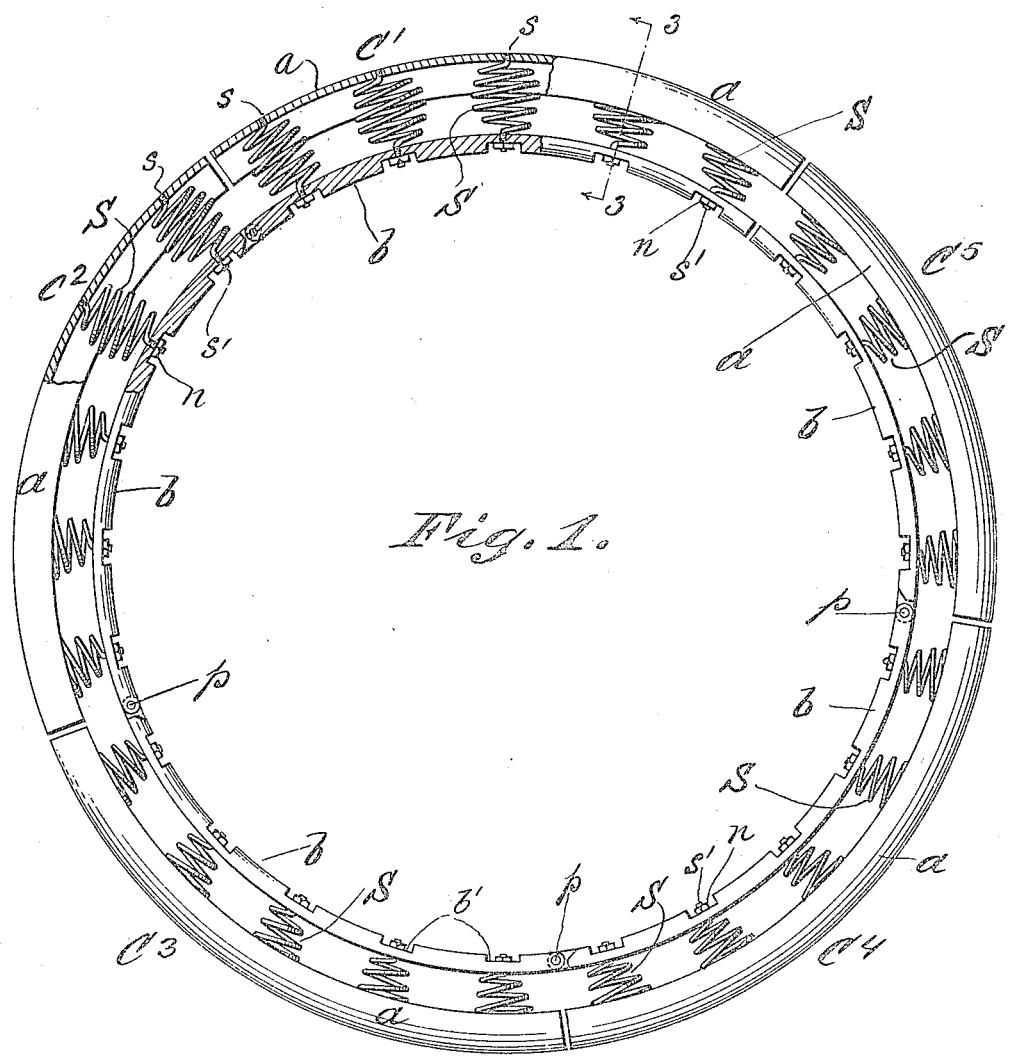
Figure 1, is a side elevation of my improved elastic resilient tire core or filler, partially in section.

My improved tire core is preferably made in five segmental subdivisions $C'$, $C^2$, $C^3$, $C^4$, and $C^5$, although it may consist of any desired number of such segmental subdivisions as may be desired or found most expedient in adapting the core to tires designed for various kinds of traffic.

One of these segmental subdivisions, as $C^5$, in the drawings, is preferably made somewhat shorter than the others to facilitate manipulation when the core is being applied to or removed from a hollow tire or casing, such for instance as the hollow tread shoe type T, indicated in Fig. 4, in which R, represents a clencher rim of a wheel.

What may be designated as the rim or base-sections $b$, $b$, of the several segmental subdivisions of the core are articularly connected together by any suitable or well known mechanical expedient that will admit of the subdivisions being inturned with relation to each other, as indicated in Fig. 2, so that they may be folded into compact form for transportation or storage; but more particularly to facilitate their insertion into or removal from a hollow tire or casing,—it being obviously easier to insert or remove the core segmentally, one or more subdivisions at a time, rather than in its entirety as a complete annular structure.

Figure 5:
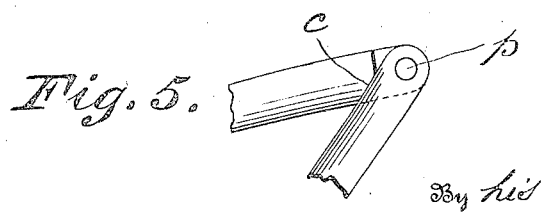
Fig. 5, is a detail upon a larger scale of a preferred form of articular joint used between adjacent segmental subdivisions.

The base sections $b$, $b$, of the five subdivisions $C'$, $C^2$, $C^3$, $C^4$, and $C^5$, may be thus articularly and permanently connected together successively, the one to the other, as shown in Figs. 1, and 2,—by means of a pintle, or equivalent, $p$. The ends of the subdivisions may be formed with any form of hinge-joint. I prefer, however, the form of articular joint shown more particularly in Fig. 5, in which one part is chamfered off as at $c$, to admit of the folding of the subdivisions into close relationship.

The base sections $b$, $b$, of the core are united to the peripheral tread supporting sections $a$, $a$, by means of elastic resilient springs S, S, interposed between said parts and having their ends rigidly secured thereto. Thus, as shown in the drawings the threaded outer ends $s$, $s$, of the said springs S, S, engage with female screw threads formed for their reception in the peripheral tread-supporting sections $a$, $a$, while the threaded inner ends $s'$, $s'$, of said springs S, S, engage with nuts $n$, $n$, which are countersunk in recesses $b'$, $b'$, formed for their reception in the base sections, $b$, $b$, all as shown more particularly in Figs. 3, and 4, by reference to which it will be also seen that the rounded wedge shape in cross section of the outer sides of the base sections $b$, $b$, tends constantly (as in Fig. 4) to spread and sustain the edges $t$, $t$, of the tire shoe T, in engagement with the clencher rim R, of the wheel.

The cushion springs S, S, any suitable number of which may be included in each subdivision of the core, being made of suitable elastic resilient material, as tempered steel or the equivalent, are an effectual substitute for the air cushion heretofore used in the form of the well known pneumatic tube; and the peripheral tread supporting sections $a$, $a$, being rigid, reinforce and sustain the peripheral or tread portion of the hollow tire or casing T, more effectually than the rubber pneumatic tube.

My improved tire core is simple, cheap and effective, is puncture proof, and has many other practical advantages over the pneumatic core which it is designed to replace. Furthermore its durability and "life" far exceeds that of many pneumatic cores or fillers, and it is easily applied to or removed from a hollow tire without special preparation or the use of special implements. It is always "filled" and ready for application and use; and extra cores may be stowed away in small space, out of sight in the vehicle in case of emergency, although as a matter of fact the danger of injury to my core under ordinary conditions of use is so remote as to render such duplication only a precautionary measure, and not an absolute necessity as in the case of the pneumatic core.

What I claim as my invention and desire to secure by Letters Patent is,

1. A separable insertible core for tire casings such as designated, comprising a plurality of articularly connected segmental subdivisions, each consisting of a base section and a peripheral tread-supporting section united by coiled springs interposed between them and connected therewith.

2. A separable insertible core for tire casings, comprising a plurality of segmental subdivisions, each subdivision comprising a base section and a peripheral tread-supporting section curved to conform to the curvature of the casing, springs interposed between and uniting the base sections and the tread-supporting sections, and means articularly connecting together the adjacent ends of the base sections.

HARRY MELTZER.

Witnesses:
  DOROTHY MIATT,
  GEO. WM. MIATT.